United States Patent [19]
Oster

[11] 3,790,778
[45] Feb. 5, 1974

[54] DYNAMIC BIASING ARRANGEMENT FOR SPEED REGULATION

[75] Inventor: Lloyd Robert Oster, Erie, Pa.

[73] Assignee: General Electric Company, Erie, Pa.

[22] Filed: Dec. 13, 1972

[21] Appl. No.: 314,742

[52] U.S. Cl............ 246/182 C, 105/61 R, 318/327
[51] Int. Cl............................................. B60l 15/20
[58] Field of Search ........ 246/182 R, 182 C, 187 B; 180/105 G; 105/61 R; 318/619, 596, 345, 326, 327, 269

[56] References Cited
UNITED STATES PATENTS

| | | | |
|---|---|---|---|
| 2,760,131 | 8/1956 | Braunagel | 318/619 |
| 3,317,806 | 5/1967 | Farinelli et al. | 318/326 |
| 3,725,758 | 4/1973 | Loyk | 318/269 |

*Primary Examiner*—Robert G. Sheridan
*Assistant Examiner*—George H. Libman
*Attorney, Agent, or Firm*—Dana F. Bigelow; Walter C. Bernkopf

[57] ABSTRACT

A speed regulator arrangement for traction vehicles wherein, in response to velocity error, motoring and braking functions are modulated in comparatively infrequent cycles to monitor vehicle speed within comparatively narrow tolerance limits. A low gain amplification of the velocity error is obtained when the amplitude thereof lies within a predetermined band of operation and a higher gain characteristic is obtained when the amplitude thereof lies outside the predetermined band of operation.

7 Claims, 2 Drawing Figures

DYNAMIC BIASING ARRANGEMENT FOR SPEED REGULATION

BACKGROUND OF THE INVENTION

This invention relates generally to speed regulator systems and in particular to vehicular speed regulation by motoring and braking modulation in response to velocity error.

Speed regulation of vehicles such as railway trains has long been desirable for reasons of economy and safety, but more importantly, to facilitate scheduling with reasonable accuracy and dependability. Where the road bed is substantially level the vehicle speed can be regulated quite accurately to correspond within close tolerances to the desired speed. However, a non-uniform profile of the roadbed necessitates modulation of tractive power and braking effort in order to monitor any degree of speed control. Load variations on the train add to the problem of non-uniform roadbed gradients, and the inherent characteristic of high inertia in a train makes speed regulation a difficult task.

Although this function has been performed in the past by skilled engineers, present systems utilize automatic control systems to produce the many different performance profiles that are required to obtain the desired regulation. A common approach for control is to use an error signal to modulate tractive effort, whereby the speed regulator output is a voltage whose amplitude is proportional to the speed error. The gain of this relationship is important in that if it is too low, then too large a speed variation is required to produce a torque variation and the system fails to hold the speed within required tolerances. Conversely, if the gain is too high the torque will respond to very slight speed changes, and the result is the occurrence of excessively short cycling times.

It is therefore an object of this invention to provide an improved speed regulator system responsive to velocity error.

Another object of this invention is the provision in a traction vehicle for the automatic speed regulation within prescribed narrow tolerances.

Still another object of this invention is the provision in a vehicle speed regulation system for minimum cycling in the modulation of traction effort.

Yet another object of this invention is the provision for the maintenance of a substantially uniform vehicle speed over a roadbed having a non-uniform profile.

A further object of this invention is the provision for a speed regulation control system which is economical to manufacture, and effective in use.

These objects and other features and advantages become more readily apparent upon reference to the following description when taken in conjunction with the appended drawings.

SUMMARY OF THE INVENTION

Briefly, in accordance with one aspect of the invention, circuitry is connected to the output of a speed regulator for amplifying the speed regulator error voltage with either high or low gain rates depending on the band of operation. Low gain amplification is provided within a specified operating band, whereas high gain amplification is provided when the error signal from the speed regulator lies outside of that operating band. Low gain output is obtained by simply applying the speed regulator output to operational amplifiers, whereas high gain output is obtained by applying an additional signal to the operational amplifiers so as to increase the effective gain when the system operates outside a predetermined band of operation. The additional signal is received from an integrating circuit which is actuated to track the regulator error voltage when it increases above a first predetermined amplitude or decreases therefrom to a second predetermined amplitude.

In the drawings as hereinafter described, a preferred embodiment is depicted, however, various other modifications and alternate constructions can be made thereto without departing from the true spirit and scope of the invention.

DESCRIPTION OF THE PREFERRED EMBODIMENT

Figure 1:
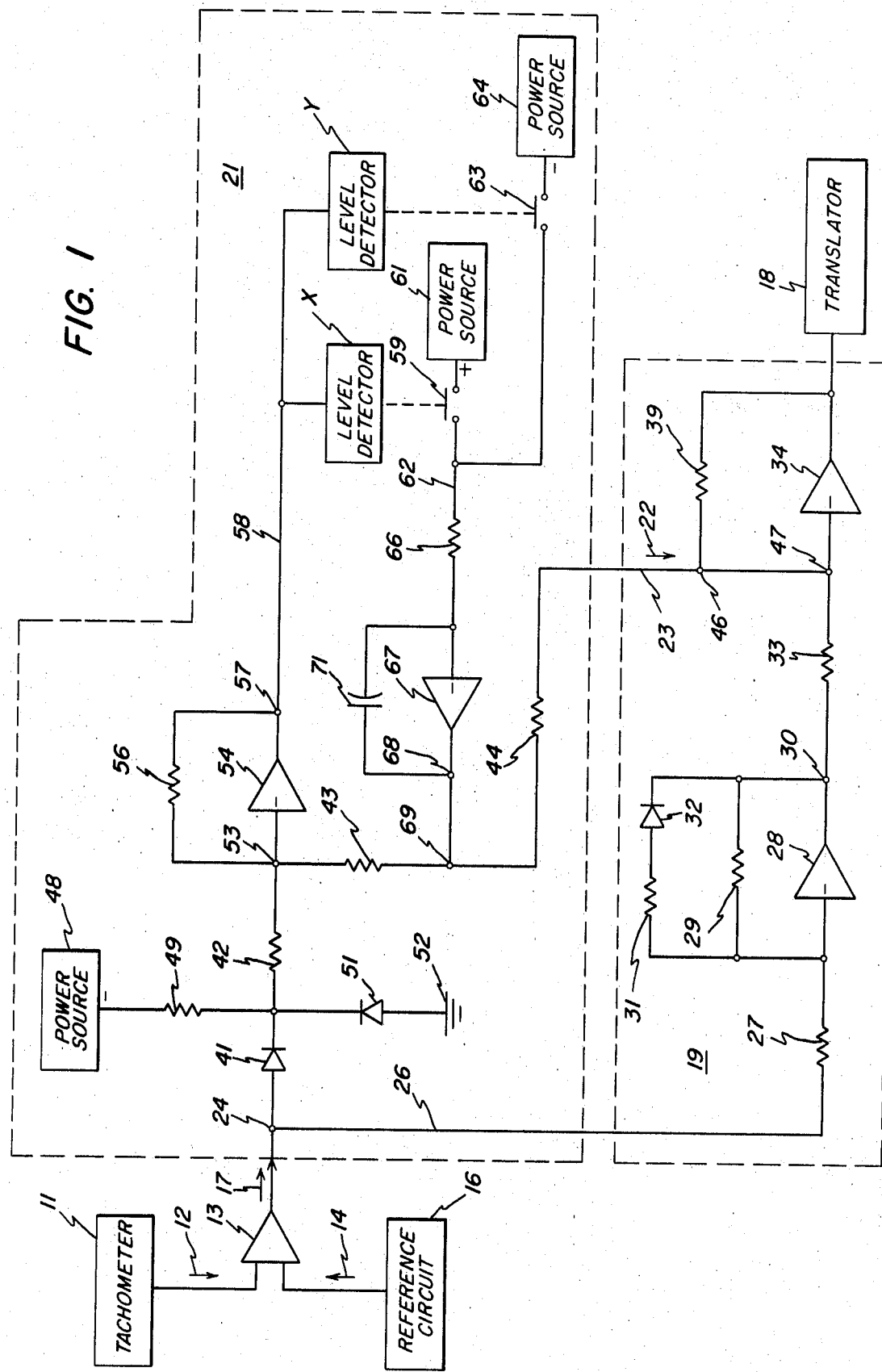
FIG. 1 is a schematic illustration of the circuit as contemplated in accordance with this invention.

Reference is now made to FIG. 1 which shows a system for monitoring speed by the closed loop principle of comparing actual velocity to a speed reference and generating an analog error signal to maintain the desired velocity. As illustrated, a tachometer 11 provides a feedback signal 12 to an operational amplifier 13. The d-c voltage signal 12, which is proportional to actual vehicle velocity, is compared to the speed reference signal 14 from a reference circuit 16. The resultant is a velocity error signal 17 which is positive for power, zero for coast and negative for braking demands.

In conventional speed regulation systems the velocity error signal 17 is fed directly to the translator 18 which converts the analog signal into a positive d-c signal for control of the mode and magnitude of operation in the motoring, coasting, and braking modes. The gain of the amplifier 13 is fixed regardless of difference in the feedback signal 12 and the speed reference signal 14 at any instant.

The present system inserts a pair of circuits 19 and 21 in parallel between the operational amplifier 13 and the translator 18. The low gain circuit 19 is utilized during periods of operation wherein it is desirable to have low amplification of the velocity error signal. For example, for very slight speed demand changes it is desirable to have a low rate of gain to prevent the occurrence of excessively short cycling times. Conversely, when higher speed changes are called for, a high rate of gain is preferred so as to not require too large a speed variation to produce a torque variation. The high gain circuit 21 is thus automatically activated during these periods to supplement the low gain circuit 19 with a booster signal 22 along line 23. The existance and magnitude of the booster signal 22 is determined by the magnitude of the velocity error signal 17 as will be more fully described hereinafter.

Referring to the low gain circuit 19 the velocity error signal 17 is picked up at junction 24 and passes along lead 26, through the resistor 27 to an operational amplifier 28. A resistance 29 is connected across the operational amplifier to provide a low rate of gain to the output junction 30, with a second resistance 31 and diode 32 being connected thereacross to provide a non-linear feedback element. For example, in accordance with one embodiment of the invention, the values of resistances 29 and 31 are chosen such that when the velocity error 17 is positive, the resistors 29 and 31 conduct in parallel and the gain at the junction 30 is −0.225. However, at times when the velocity error signal 17 is negative, the resistor 31 is out of the circuit and the gain at junction 30 is −1.

Figure 2:
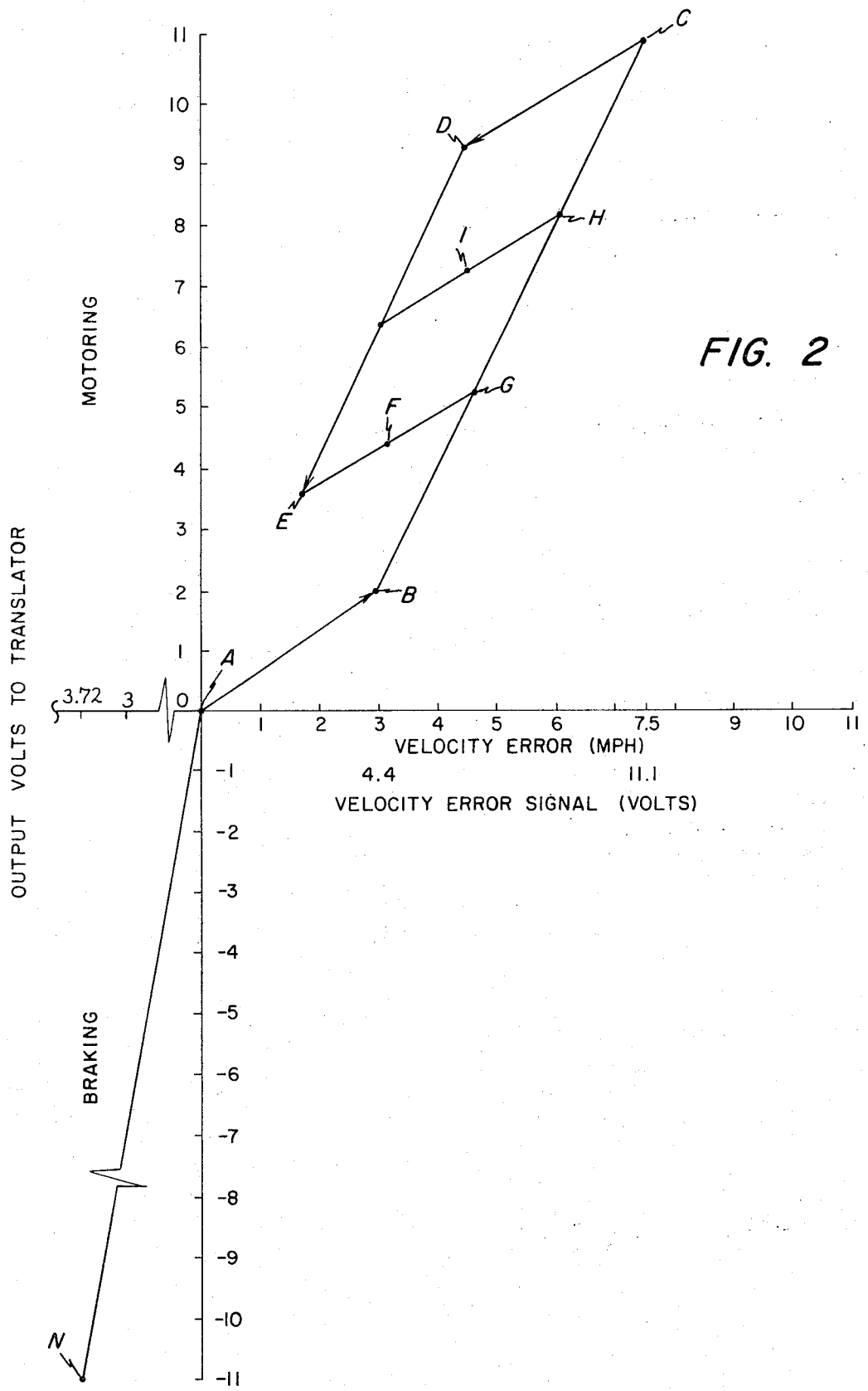
FIG. 2 is a graphic diagram of error amplifier output as affected by this invention when the speed error is varied across a predetermined band of operation.

Coupled in series to the junction 30 is a resistor 33 and an operational amplifier 34 leading to the translator 18. The operational amplifier 34 has a gain of 2, with a resistor 39 connected thereacross to act as a feedback component. The output to the translator 18 is then 0.45 times the velocity error signal 17 during periods of motoring demands and equal to twice that signal during periods of braking demands. Referring to FIG. 2, this relationship is shown in graphic form wherein the slope of line A–B represents the gain which occurs during the period of motoring wherein the speed error is from 0 to 3 mph as represented by the speed error signal of 0 to 4.4 volts. At point B where the speed error signal reaches the magnitude of 4.4 volts, the rate of gain is changed as will be more fully discussed hereinbelow.

In the braking mode, wherein the speed error signal is negative, the rate of gain and therefore the slope of the line A–N is 2 throughout the complete range of the braking mode. This linear relationship is provided because of the analogue nature of the brakes and should not be considered as a limiting characteristic of the invention. The circuit may be made to provide dynamic bias for both motoring and braking modes of operation.

To explain the gain characteristics of the system during periods when the speed error signal exceeds a magnitude of 4.4 volts we must consider the effect of the high gain circuit 21 of FIG. 1. Serially coupled to the junction 24 is an input diode 41 with resistors 42, 43, and 44 leading to line 23 input junction 46, and junction 47. The input diode 41 is clamped on its output side by the reference circuit comprising a power source 48, a resistor 49 and a diode 51 leading to ground 52, thus ensuring that the negative velocity error signals brought about by braking calls are not received by the high gain circuit.

Coupled to a junction 53 between resistors 42 and 43, is an operational amplifier 54 with its associated resistance 56 connected thereacross to provide for signals from operational amplifier 13, a −1 gain at the output junction 57. A pair of level detectors X and Y are connected to the junction 57 by line 58. These detectors are used as switches to selectively actuate an integrating circuit which utilizes either a positive or negative power source. A preferred embodiment utilizes operational amplifiers as detectors, the amplifiers each being responsive to a predetermined voltage range to actuate an associated switch. Detector X is connected to operate a switch 59 whose contacts when closed connect a positive power source 61 to line 62 of the integrating circuit. Similarly, detector Y is connected to operate a switch 63 whose contacts when closed connect a negative power source 64 to line 62. Typically, the ranges of operation of the detectors X and Y are chosen such that during periods in which the voltage on line 58 is more negative than −4.44 volts, the contactors of switch X are closed and a positive 15 volts is inserted into the circuit at 62; whereas when the voltage on line 58 is more positive than +0.2, then the contactors of switch Y are closed and a negative 15 volts is inserted into the circuit. The significance of the specific values will be better appreciated upon reference to a typical cyclic operation as will be described hereinafter.

The remainder of the integrating circuit comprises in serial connection with the line 62 a resistor 66 and an operational amplifier 67 whose output terminal 68 is connected to a junction 69 between resistors 43 and 44. A capacitor 71 is connected across the operational amplifier 67 to act as a feedback component.

As previously mentioned, the booster signal 22 is derived from the circuit 21 only during periods in which a high gain output is desired, the reference of operation for the circuit 21 being the voltage level of the velocity error signal 17 as it controls the function of the level detectors X and Y. For example, in a typical circuit having the specific operational amplifiers previously described, a high gain output will occur at any time that the magnitude of the summation of the velocity error signal 17 and the output of the operational amplifier 67 is more positive than 4.44 volts or more negative than −0.2 volts.

Referring again to FIG. 2, during the period of operation from point A to point B the output of the operational amplifier 67 is zero and that of operational amplifier 54 is −1 times the velocity error signal 17. When the output of the operational amplifier 13 reaches a magnitude of 4.44 volts, that of the operational amplifier 54 is −4.44 volts and the level detector X will pick up to close the contacts 59. With the power source 15 connected to the amplifier 67 its output will be negative and the booster signal 22 will follow line 23 to junction 46 where it reinforces the signal from the amplifier 28 and subsequently experiences a gain of −2 in the amplifier 34. At the same time the output from amplifier 67 is fed into amplifier 54 which causes its output to go in a positive direction. This will eventually drop out the level detector X unless the velocity error signal 17 has continued to rise. As a result of this network the amplifier 67 will track amplifier 54; as the velocity error signal 17 goes positive amplifier 67 will tend to compensate by going negative enough to cancel the rise and thereby hold the output of amplifier 54 at the dropout value of the level detector X. The resistors 42 and 43 are preferably chosen such that a change of the velocity signal error results in a significantly smaller change in the output of amplifier 67 since this output subsequently experiences a gain of −2 at amplifier 34.

The aforesaid condition is illustrated by the B to C portion of the curve in FIG. 2, with the increased slope occurring as a result of the booster signal 22. If the velocity error signal 17 is now reduced in value as would normally occur as the train speed increases the output of amplifier 54 will move from −4.44 volts towards zero and the level detector X will remain in a dropped out condition. The output of amplifier 67 will therefore hold the value it had at point C and the booster signal 22 will remain in a static state condition. We then revert to the low gain circuit 19 for our net output and are on that portion of the curve illustrated by the C to D line. When the velocity error signal is reduced to a certain level, it will, when coupled with the static output of the amplifier 67 result in a positive output of amplifier 54. At D an output voltage magnitude of +0.2 volts exists at the amplifier 54 and the level detector Y will pick up to close the contacts 63 and apply the negative power source 64. The amplifier 67 will again track the velocity error signal 17 and the booster signal 22 will move towards negative to again place the system in a high gain operating condition. If at any time the direction of the velocity error signal changes the output of amplifier 54 will become more negative to enter a dead band in which neither level detector X or Y is picked up, and the low gain operation will resume.

It should be noted that the pick-up and drop-out values for each of the level detectors X and Y are preferably staggered by a small amount to prevent chatter of the contacts caused by their alternate closing and opening at the critical voltage level. For example, the level detector X may be designed to pick up at a voltage level of −4.44 volts and drop out at a value of −4.24 volts. Similarly, the detector Y is typically designed to pick up at +0.2 volts and drop out at 0 volts.

A typical operational cycle might be as follows. An increase of speed is requested and the velocity error signal is correspondingly increased. Assuming the new speed requested represents an increase of greater than 7½ mph, the operating point will move from points A to B to C where a maximum output voltage of 11 volts will be delivered to the translator so as to request full torque application. As the new speed is approached and the velocity error signal 17 is reduced, the operating point will move to point D and for example, to point E. Assuming digital torque steps this would be the first torque reached that is below the load requirements. The error will accordingly increase and the operating point will move to F which represents the next torque step. The resulting torque is greater than the load and the operating points will now cycle between points E and F. If now a gradual increase in torque is needed, as would be occasioned by a positive grade, it will move to point G and up to point H in a high gain mode of operation. As the speed error is decreased the system will resume low gain operation and the operating point will cycle between points H and I.

What is claimed as new and is requested by Letters Patent of the United States is:

1. An improved vehicle speed regulator of the type having its output actuate degrees of vehicle motoring and braking in proportion to respective positive and negative error signals representative of the difference between actual speed and desired speed of a traction vehicle, wherein the improvement comprises:
    a. a first circuit coupled to receive said error signal and having amplification means to provide a low gain first output signal in response thereto;
    b. means for actuating a tractive effort in response to a positive regulator output and for actuating a braking effort in response to a negative regulator output;
    c. a second circuit coupled to receive the error signal when the error signal is positive, said second circuit having power means connected to integrating means when the summation of said error signal and the output of said integrating means reaches a first predetermined amplitude and when it subsequently decreases below a second predetermined amplitude, the output of said integrating means comprising a second output signal; and
    d. means for adding said first and second output signals during vehicle motoring to provide a speed regulator output having a high gain characteristic when the amplitude of the error signal lies outside a predetermined band of operation defined by said first and second predetermined amplitudes, and a low gain characteristic when the amplitude thereof lies inside said predetermined band of operation.

2. A speed regulator as set forth in claim 1 wherein said first circuit includes means for changing the gain rate thereof when said error signal changes between positive and negative.

3. A speed regulator as set forth in claim 2 wherein said gain rate changing means comprises a resistor and diode connected across said amplification means to provide a non-linear feedback element.

4. A speed regulator as set forth in claim 1 wherein said integrating circuit is actuated by a first operational amplifier responsive to said first predetermined amplitude of voltage to connect a positive power source to said integrating circuit and a second operational amplifier responsive to said second predetermined amplitude of voltage to connect a negative power source to said integrating circuit.

5. A speed regulator as set forth in claim 4 wherein said first and second operational amplifiers de-activate said integrating circuit in response to respective voltage levels nearly equal to but different than said first and second predetermined amplitudes.

6. A speed regulator as set forth in claim 1 wherein said second circuit comprises:
    a. a principal operational amplifier whose input includes said error signal and whose output is connected to said first and second operational amplifiers; and
    b. the integrating circuit whose output is fed into said principal operational amplifier and whose output comprises said low gain second output signal.

7. A speed regulator as set forth in claim 6 wherein said integrating circuit includes a third operational amplifier whose output is static during periods of operation when said error signal is between said first and second predetermined amplitudes.

* * * * *